INVENTORS
G. B. FLIEZAR
J. J. MONAHAN

July 10, 1962 G. B. FLIEZAR ETAL 3,043,449
LOADING GAGES FOR WAVE TUBE EXHAUSTING MACHINE
Filed Nov. 18, 1959 3 Sheets-Sheet 2
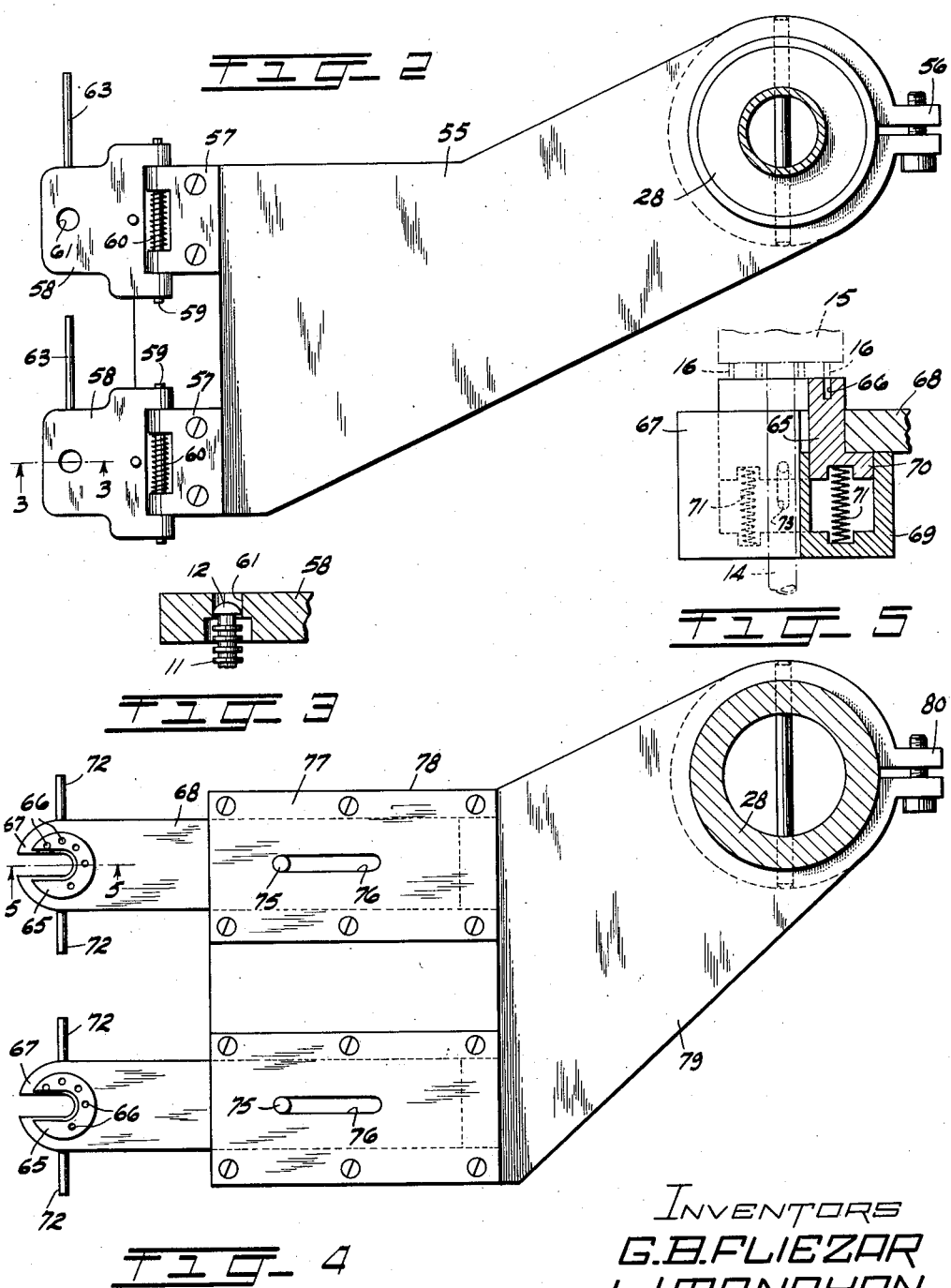
INVENTORS
G.B.FLIEZAR
J.J.MONAHAN July 10, 1962 G. B. FLIEZAR ETAL 3,043,449
LOADING GAGES FOR WAVE TUBE EXHAUSTING MACHINE
Filed Nov. 18, 1959 3 Sheets-Sheet 3
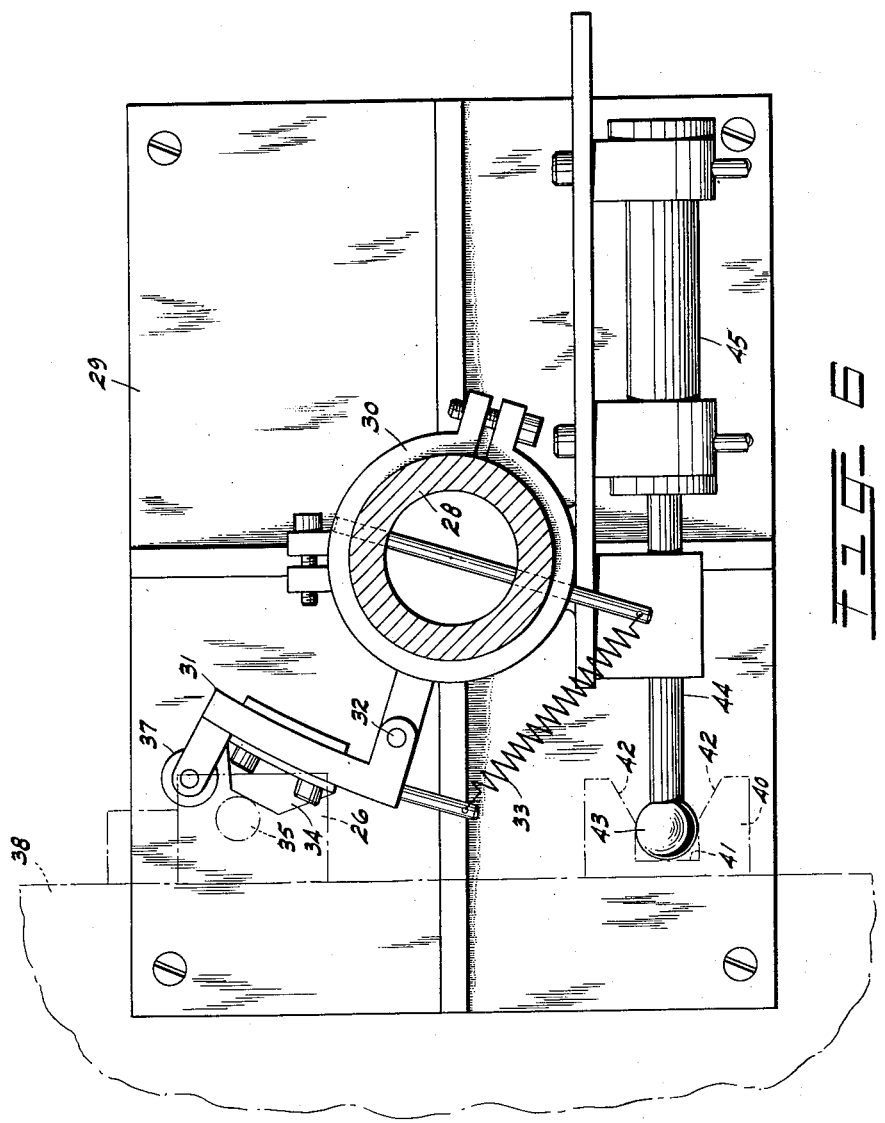
INVENTORS
G.B.FLIEZAR
J.J.MONAHAN
By
ATTORNEY

United States Patent Office

3,043,449
Patented July 10, 1962

3,043,449
LOADING GAGES FOR WAVE TUBE EXHAUSTING MACHINE
Geza B. Fliezar and Jack J. Monahan, Allentown, Pa., assignors to Western Electric Company, Incorporated, New York, N.Y., a corporation of New York
Filed Nov. 18, 1959, Ser. No. 853,964
4 Claims. (Cl. 214—1)

This invention relates to loading apparatus particularly apparatus for loading elongated articles vertically in holders therefor.

In the present instance, the elongated articles are traveling wave tubes which have been assembled and which must be moved into successive processing stations where operations are performed thereon. In order that the processes or operations may be performed on the article efficiently, the article must be mounted accurately in its holder for accurate presentation at the successive operating stations.

The object of the present invention is a simple, efficient, and highly accurate loading apparatus for elongated articles.

In accordance with the object, the invention comprises an apparatus for loading like elongated articles each having an upper end, a tubulation at the lower end and an intermediate base with parallel terminals extending downwardly therefrom and disposed about the tubulation, in tubulation receiving holders of carriages moved successively into and out of a loading station. The apparatus, in the present instance, comprises an apertured end locator for the upper end of the article mounted on a support with its aperture in alignment with the holder, and a base locator having recesses for the terminals and bifurcated to straddle the tubulation to assist in orienting the article with respect to the holder and cooperating with the end locator to position the article in the holder.

More specifically, the end locator is pivotally mounted on an arm extending laterally from a vertical support and although normally held in locating position by a spring, means is provided for moving the end locator away from the article to free it to move out of the loading station with the carriage. Furthermore, the base locator is spring-pressed upwardly in a bifurcated end of a slide with means to move the base locator downwardly after the article is mounted in the holder to free the base locator from the terminals of the article for movement laterally with the slide relative to its supporting arm free of the mounted article.

Other objects and advantages will be apparent from the following detailed description when considered in conjunction with the accompanying drawings wherein:

FIG. 2 is an enlarged horizontal sectional view taken along the line 2—2 of FIG. 1;

FIG. 3 is an enlarged fragmentary sectional view taken along the line 3—3 of FIG. 2;

FIG. 4 is an enlarged horizontal sectional view taken along the line 4—4 of FIG. 1;

FIG. 5 is an enlarged fragmentary sectional view taken along the line 5—5 of FIG. 4; and FIG. 6 is an enlarged horizontal sectional view taken along the line 6—6 of FIG. 1.

Figure 1:
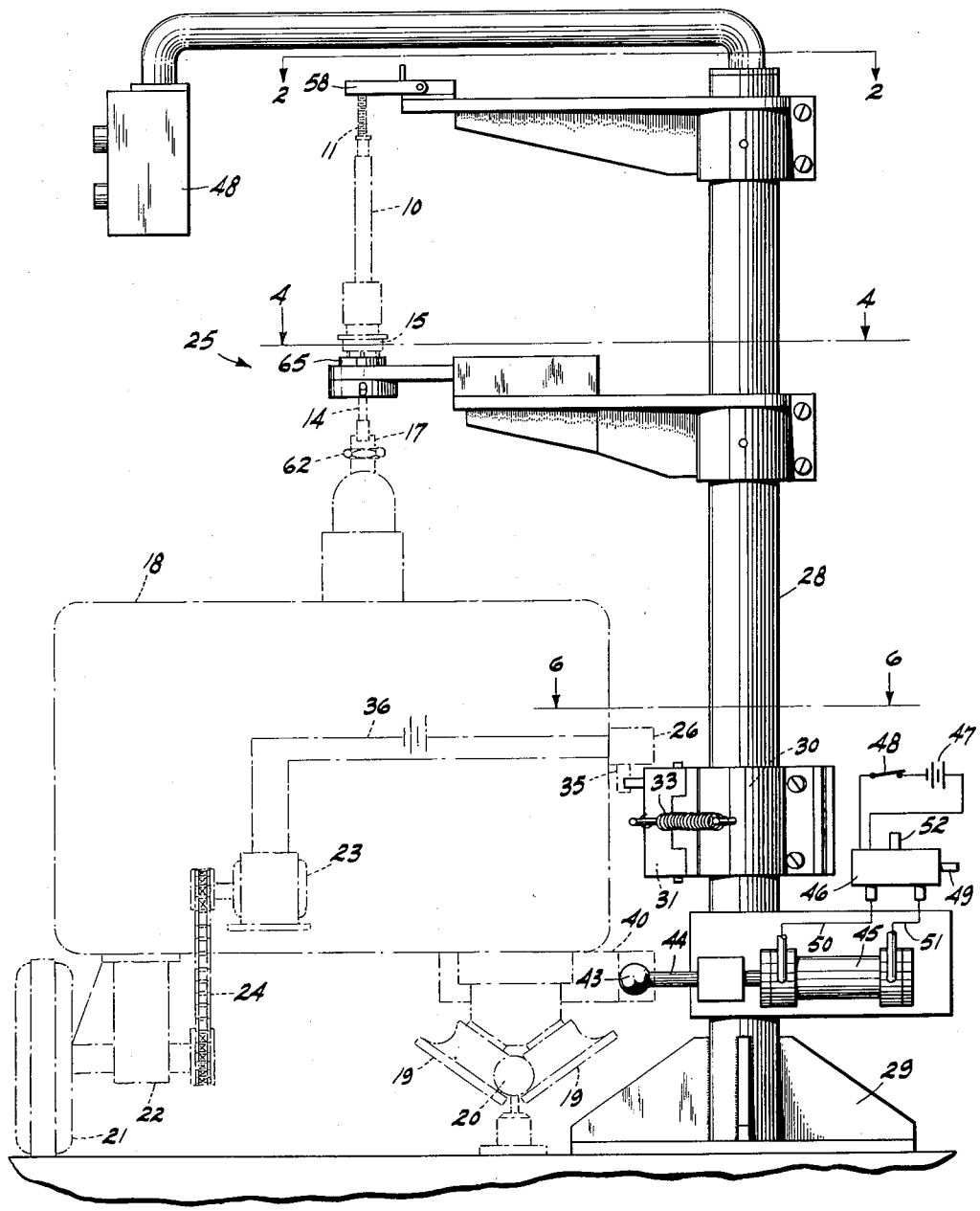
FIG. 1 is a front elevational view of the apparatus.

The article 10, in the present instance, is a traveling wave tube having an upper portion 11 with a rounded end 12, a tubulation 14 at its lower end and an intermediate base 15 with terminals 16 mounted at given spaced positions therein and extending partially about the tubulation 14 parallel therewith. In the present instance, two articles 10 are to be mounted in spaced holders 17 of each of a plurality of carriages 18 as disclosed in applicants' co-pending application Serial No. 854,279, filed Nov. 20, 1959, now Patent No. 2,904,169.

In FIG. 1 only one holder and one article appear in that the two holders are in direct alignment with each other and are spaced known distances apart on the carriage 18. Each carriage 18 is provided with pairs of grooved rollers 19 positioned to ride on a track 20 which extends through the successive processing stations for the articles 10. A pneumatic tired wheel 21, rotatably mounted at 22, assists in supporting the carriage 18 and, when driven by a motor 23 through drive means 24, the carriage is moved into and out of the loading station 25 and the subsequent processing stations (not shown). The motor 23 is under the control of a normally closed switch 26 to drive the carriage 18 by driving the wheel 21.

A vertical support 28 mounted at 29 adjacent the loading station 25 has a bracket 30 mounted thereon which supports a lever 31, FIGS. 1 and 6, pivoted at 32 and normally urged counterclockwise by a spring 33. The lever 31 carries a cam 34 positioned to actuate, under the force of the spring 33, a switch arm 35 of switch 26, to open the switch 26. Opening of the switch 26 opens a circuit, indicated at 36 to the motor 23, to de-energize the motor and stop the carriage at a predetermined position as it enters the loading station. A roller 37, mounted on the bracket 31, serves to engage the side wall 38 of the carriage 18 to hold the cam 34 out of engagement with the carriage as, in actual practice, the carriage moves around a curved portion of the track 20 when moving into the loading station.

Each carriage 18 carries a member 40 recessed at 41 with outwardly extending surfaces 42 to receive a ball-shaped end 43 of a locating and locking plunger 44. The plunger 44 is a part of a piston rod of an air cylinder 45 which is under the control of a valve 46 and a control circuit 47. The circuit 47 includes a switch 48, shown schematically in the lower portion of FIG. 1 and structurally in the upper portion thereof. The switch 48 normally is open permitting the valve 46 to be in its normal position directing air from a supply line 49 through the valve 46 and line 50 to move the plunger 44 to the right and hold it out of the path of the member 40. When each carriage is in the loading station, the operator may operate the switch 48 closed to energize the valve 46 to connect supply line 49 to line 51 to force the plunger outwardly to engage either surface 42 to move the carriage and the holder 17 into their loading positions and when the ball member 43 enters the recess 41, the carriage and holders will be in said positions and locked against movement until the loading operations have been completed. The valve 46 has a conventional exhaust line 52 connected to either line 50 or 51 to exhaust the air at the opposite side of the piston from which air is being supplied from line 49.

An upper arm 55 is mounted at 56 on the support 28 and has hinge members 57 mounted thereon. End locators 58 are pivotally mounted on rods 59 carried by the members 57 and are normally urged into the horizontal locating positions by suitable means such as springs 60. The end locators 58 have apertures 61 disposed at given positions therein and like distances apart, these distances equaling the distance between centers of the holders 17 on the carriage. Each aperture 61 is of the contour shown in FIG. 3 with a larger lower portion greater in diameter than the end 12 of the article, while the upper portion of the recess has a diameter substantially equaling the diameter of the semi-spherical end 12 of the article 10. In this manner, each end locator 58 will serve its purpose in accurately locating the end 12 of each article in alignment with the holder 17 in which the tubulation 14 is to be placed and secured by the operation of a threaded element 62. Each end locator 58 has a handle 63 for use in moving the end locator about its pivot 59 free of the article when the article is mounted in the holder 17.

A base locator 65 is provided for each base 15 and has recesses 66 of given depths and at predetermined locations therein corresponding to the locations of the terminals 16 of the base. Each base locator 65 is bifurcated to straddle the tubulation 14 and is mounted for vertical movement in a bifurcated end 67 of a slide 68. A hollow bifurcated member 69 fixed by suitable means, not shown, to the bifurcated end 67 of each slide 68, receives an enlarged lower end 70 of the base locator 65 for vertical movement therein. Springs 71 are disposed in a hollow member 69 and have their ends imbedded in recesses of the lower portion of the member 69 and the enlarged lower portion 70 of the base locator, to urge the base locator upwardly to its locating position. Handles 72 extending through elongated apertures 73 in the member 69 have their inner ends fixed to the enlarged lower member 70 of the base locator 65 so that the base locator may be moved downwardly to free it from the terminals 16 when the article has been located in and secured in its respective holder 17. Each slide 68 has a locating pin 75 mounted therein and extending vertically through an elongated aperture 76 in a cover 77 of a guide portion 78 for its slide. The guide portions 78 are parts of an arm 79 secured at 80 to the vertical support 28.

Operation

As each carriage 18 moves into the loading station, its driving means, namely the motor 23 for driving the wheel 21, is de-energized automatically by the cam 31 opening the switch 26. At this time, the operator closes switch 48 operating valve 46 to force the plunger 44 outwardly and, in so doing, the ball member 43 will first position the carriage to locate the holders in vertical alignment with their respective end locators 58 and base locators 65. These locators may be in position as the carriage 18 moves into the loading station is stopped, located, and locked against movement. The articles 10 are mounted singly by moving them laterally to line the tubulation 14 with the holder 17 and downwardly to lower the tubulation in the holder and position the terminal 16 in their respective recess 66 of the base locator 65. At this time, the end locator 68 which has been held vertically is moved into engagement with the end 12 to assure alignment of the article vertically through its cooperation with the base locator. The recesses 66 assure accurate orientation of the article in each instance with respect to the holder 17, and assure also the accurate elevation of the article to position the base vertically a predetermined distance from the holder. Furthermore, the two locators 58—65, in each instance, assure vertical alignment of the article with the holder so that the article will be in accurate position for its subsequent processing operations.

Once the article is in position, the holder may be actuated through the element 62 to secure the tubulation in place, after which the locators may be moved free of the article. As there are two pairs of locators, the base locators are moved out of locating position first by lowering the base locators through the aid of the handles 72 against the forces of the springs 71 to free the terminals 16 from the recesses 66, after which the base locators are moved laterally with the slide 68.

The base locator 65, in each instance, and its slide 68 are held in the locating positions by the pin 75 engaging the forward end of its aperture 76. When the base locators have been moved out of their location positions, the end locators 58 may be moved vertically free of the upper ends 12 of the articles and through the aid of suitable means, not shown, the carriage 18 may be moved out of the loading station, freeing the switch 26 to close to energize the driving means 23 of the carriage.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for loading like elongate articles, each having an upper end, a tubulation at the lower end and an intermediate base with parallel terminals extending downwardly therefrom and disposed at predetermined spaced positions about the tubulation, in tubulation receiving holders of carriages where they are firmly secured for movement with the carriages successively out of a loading station comprising a vertical support mounted at a fixed position adjacent the loading station, a top arm mounted on the support and extending laterally into the loading station, an end locator pivotally mounted on the top arm and having an aperture therein aligned with the holder of the carriage in the loading station and of a contour to removably receive and locate the upper end of the article, a lower arm mounted on the support and extending laterally toward the loading station, a slide having an inner end and a bifurcated outer end, a guide carried by the lower arm to support the slide and guide the inner end for movement of the slide between a normal position out of the loading station and a loading position in the station, and a bifurcated base locator supported by the bifurcated end of the slide and having recesses spaced to receive the terminals only when the article is in a predetermined position to orient the article relative to the holder where it may be secured with the tubulation in the holder and to cooperate with the end locator to locate the oriented article in vertical alignment with the holder.

2. An apparatus for loading like elongate articles according to claim 1 in which the bifurcated end of the slide has an aperture therein substantially conforming in cross-sectional contour to the base locator to receive the base locator for vertical movement therein, and force applying means normally holding the base locator in its up locating position.

3. An apparatus for loading like elongate articles according to claim 2 in which both the bifurcated end of the slide and the bifurcated base locator straddle the tubulation of an article loaded in the holder, and means actuable to move the base locator downwardly free of the terminals and laterally with the slide out of the loading station.

4. An apparatus for loading like elongate articles according to claim 2 in which an element is movable with the slide relative to the guide, and stops for the element to respectively stop the slide in and out of locating position.

References Cited in the file of this patent

UNITED STATES PATENTS

| | | |
|---|---|---|
| 429,370 | Watson | June 3, 1890 |
| 1,481,075 | Strouse | Jan. 15, 1924 |
| 2,329,932 | Nelson | Sept. 21, 1943 |
| 2,737,839 | Paget | Mar. 13, 1956 |
| 2,828,024 | True | Mar. 25, 1958 |
| 2,868,240 | Roeber | Jan. 13, 1959 |